J. R. BARNES.
SPRINKLER.
APPLICATION FILED AUG. 21, 1909.
974,628.
Patented Nov. 1, 1910.
3 SHEETS—SHEET 2.
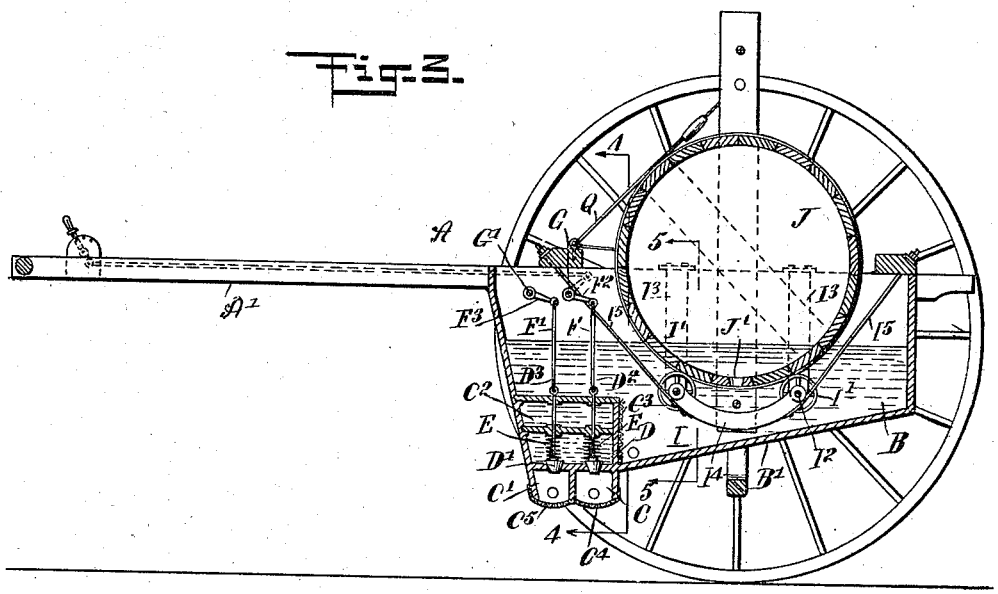
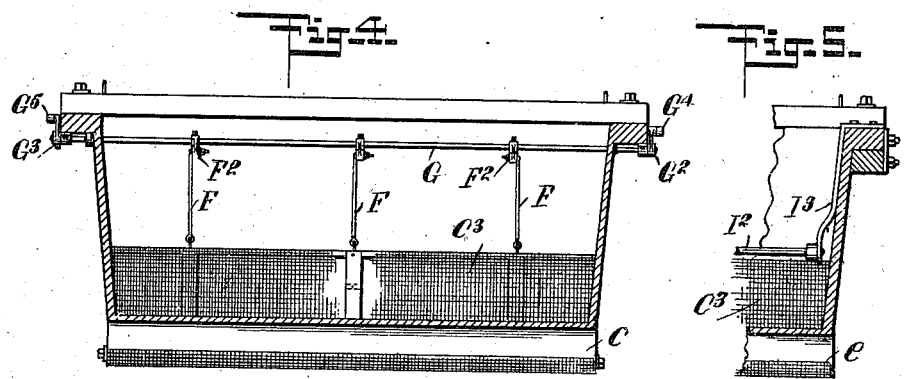
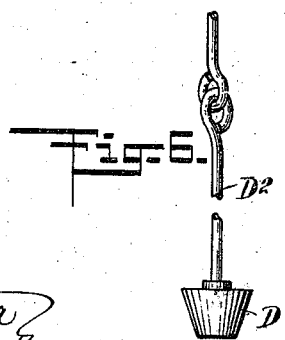
WITNESSES
INVENTOR
John Robertson Barnes
BY
ATTORNEYS J. R. BARNES.
SPRINKLER.
APPLICATION FILED AUG. 21, 1909.
974,628.
Patented Nov. 1, 1910.
3 SHEETS—SHEET 3.
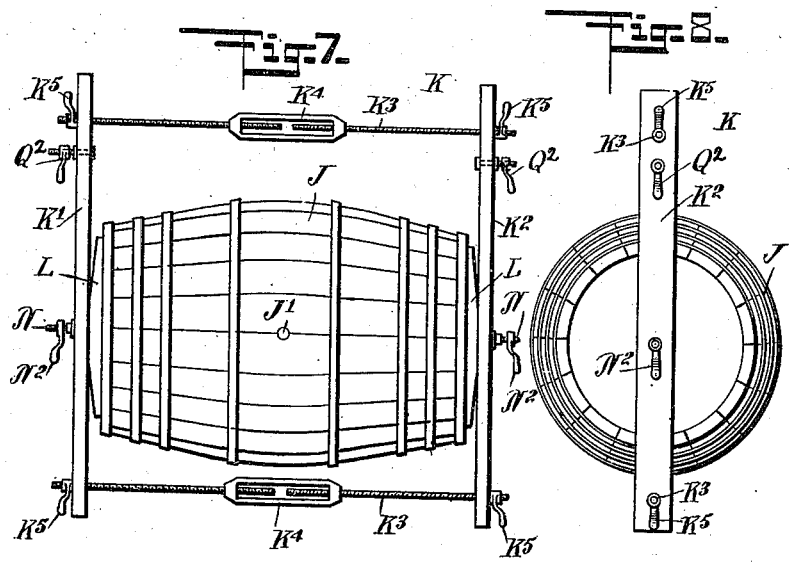
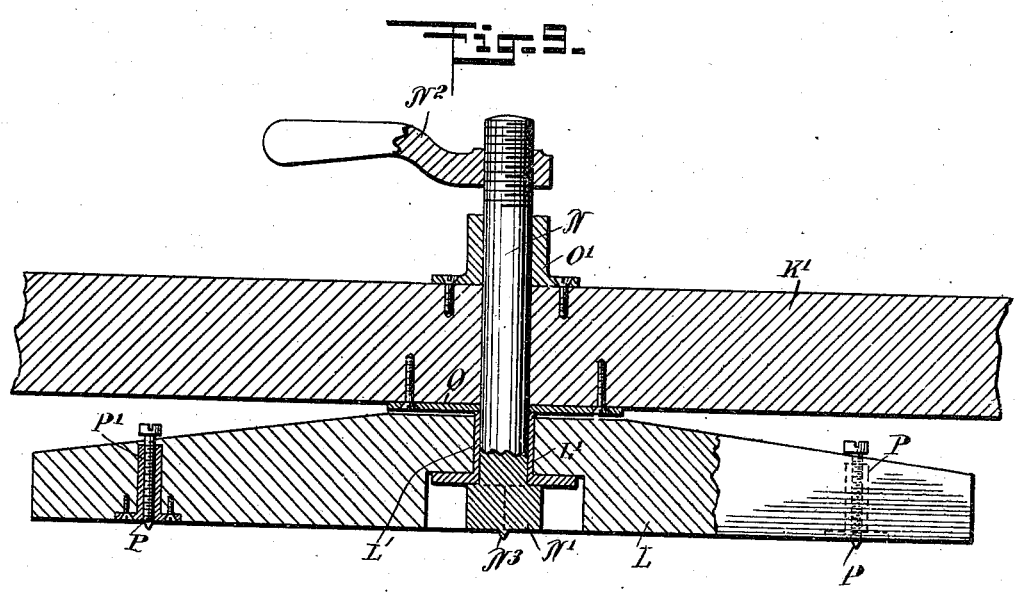
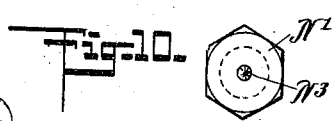
WITNESSES
INVENTOR
John Robertson Barnes
BY
ATTORNEYS

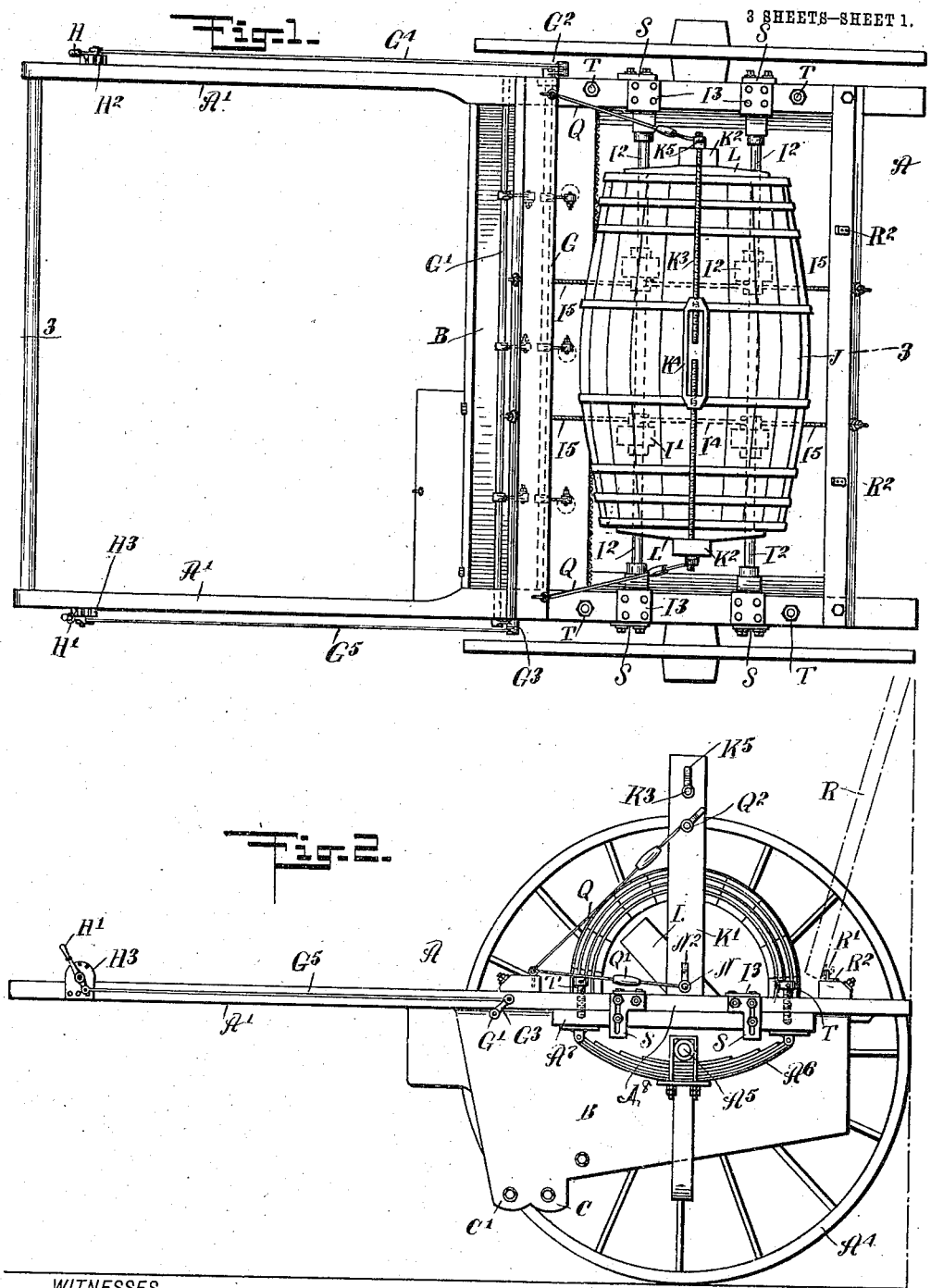

UNITED STATES PATENT OFFICE.

JOHN ROBERTSON BARNES, OF NEW YORK, N. Y.

SPRINKLER.

974,628.

Specification of Letters Patent.

Patented Nov. 1, 1910.

Application filed August 21, 1909. Serial No. 514,031.

To all whom it may concern:

Be it known that I, JOHN ROBERTSON BARNES, a citizen of the United States, and a resident of the city of New York, Jamaica, borough of Queens, in the county of Queens and State of New York, have invented a new and Improved Sprinkler, of which the following is a full, clear, and exact description.

The object of the invention is to provide a new and improved sprinkler for use on roads, lawns and other places requiring sprinkling with oil, liquid manure or other liquids, the arrangement being such that the barrel containing the liquid can be readily placed in position on the sprinkler and emptied of its contents, and the liquid can be uniformly sprinkled onto the desired surface as required. For the purpose mentioned, use is made of a wheeled vehicle capable of being moved about and supporting a tank open at the top, the tank containing a barrel support for supporting the barrel to be emptied into the tank.

A practical embodiment of the invention is represented in the accompanying drawings forming a part of this specification, in which similar characters of reference indicate corresponding parts in all the views.

Figure 1 is a plan view of the improved sprinkler; Fig. 2 is a side elevation of the same; Fig. 3 is a sectional side elevation of the same on the line 3—3 of Fig. 1; Fig. 4 is a transverse section of the same on the line 4—4 of Fig. 3; Fig. 5 is a similar view of the same on the line 5—5 of Fig. 3; Fig. 6 is an enlarged side elevation of one of the valves of a sprinkler head; Fig. 7 is a plan view of the frame in which the barrel is mounted; Fig. 8 is a side elevation of the same; Fig. 9 is an enlarged sectional view of part of the barrel frame; and Fig. 10 is a side elevation of one of the trunnions for a frame arm to turn on.

On the body of a two-wheeled vehicle A is mounted a tank B, open at the top and provided with an inclined bottom, from the lower forward end of which depend sprinkler heads C, C' for sprinkling liquids of different density, as required, as hereinafter more fully explained. The admission of the liquid from the tank to the sprinkler heads C, C' is controlled by valves D, D', normally held to their seats in the bottom B' of the tank by springs E, and the said valves D, D' are arranged within a chamber $C^2$, provided at the rear with a transversely-extending screen $C^3$, so as to screen the liquid prior to its passage into the corresponding sprinkler head C or C' by way of the valves D, D' whenever the latter are opened. The valves D and D' are provided with valve stems $D^2$, $D^3$, guided in the chamber $C^2$ and pivotally connected at their upper ends by links F, F' with arms $F^2$, $F^3$, secured on transversely-extending shafts G, G' journaled in the sides of the tank B. On the outer ends of the shafts G, G' are secured arms $G^2$, $G^3$, connected by forwardly-extending links $G^4$, $G^5$ with hand levers H, H', fulcrumed on segments $H^2$, $H^3$, carried on the handles A' of the wheeled vehicle A and used for moving the vehicle over the surface to be sprinkled. The hand levers H, H' are adapted to be locked to the segments $H^2$, $H^3$ so as to hold the valves D, D' open a desired distance to regulate the amount of liquid to be sprinkled by the heads C, C' onto the surface below. The sprinkling heads C, C' are provided at their bottoms with strainers $C^4$, $C^5$ of different mesh, to permit the free flow of liquids of different density, according to the nature of the surface to be sprinkled at the time, that is to say, for sprinkling heavy oils use is made of the head C having the strainer $C^4$, of larger mesh than the strainer $C^5$ of the head C', used for sprinkling liquid manure or a liquid of lesser density.

Within the tank B is arranged a barrel support I, for supporting a barrel J containing the desired liquid to be sprinkled and with which the tank B is to be filled for the time being, it being understood that according to the nature of the liquid used, the corresponding sprinkling head C or C' is made use of. The barrel support I consists of wheels I' journaled on rods $I^2$, supported at their ends on brackets $I^3$, attached to the vehicle frame, and the rods $I^2$ are also connected with each other adjacent to the wheels I' by bars $I^4$ connected by stays $I^5$ with the body of the vehicle, as plainly indicated in Figs. 1 and 3. The barrel J when supported on the wheels I' can be readily turned so as to bring its bung hole J' into a lowermost position to allow the contents of the barrel to discharge into the tank B, from which the liquid passes into the chamber $C^2$ and by way of either valve D, D' into the corresponding sprinkling head C or C'. The barrel J, prior to being moved into position in the tank B is mounted on a barrel frame K, shown in detail in Figs. 7, 8, 9 and 10, and consisting of side bars K', K² connected with each other near their ends by screw rods K³, having turn buckles K⁴ and handled nuts K⁵ at the ends for adjusting the side arms K', K² nearer to or farther from each other, according to the length of the barrel. The heads of the barrel J are adapted to be engaged by arms L, each mounted on a trunnion N, journaled in bearings O, O', attached to the corresponding side bar K' or K², as plainly shown in Fig. 9, the trunnion N being provided at its inner end with a head N', adapted to abut against the bearing L' in the arm L. On the outer end of the trunnion N screws a nut N² adapted to abut against the bearing O', to clamp the arm L into position against movement on the corresponding bar K' or K². The head N' is provided with a central point N³, adapted to engage the head of the barrel J at the center thereof, and each side arm L is provided near its ends with pointed screws P screwing in nuts P' attached to the arm L, so that the points of the screws P engage the heads of the barrel to securely fasten the corresponding arm L to the corresponding head of the barrel. The side bars K', K² are adapted to be held in a vertical position by stays Q, Q', connected with the body of the vehicle A, as shown in Figs. 1 and 2, the braces Q being connected with clamping nuts Q² attached to the side bars K', K² near the upper ends thereof, while the braces Q' are adapted to be connected with the trunnions N and fastened in place by the nuts N².

When the frame K is attached to the barrel J, as shown in Figs. 7 and 8, while the barrel is on the roadway or other support, then use is made of a skid R having hooks R', adapted to be moved onto keepers R², secured to the frame of the vehicle A at the rear end thereof, it being understood that when the skid R is attached to the keepers R² the handle A' of the vehicle will stand in a vertical position, as will be readily understood by reference to the dotted lines indicated in Fig. 2. The lower end of the skid R now rests on the ground, and the barrel J can be readily pushed over the skid R by the operator having hold of the frame K, the arms L now turning freely on the trunnions N. The barrel J is finally moved into the open tank B while the latter is in the position with the open end to one side, so that the barrel J readily moves onto the barrel support I, after which the handles A' of the wheeled vehicle A are swung downward into the normal, horizontal position shown in full lines in Figs. 1, 2 and 3. The side bars K', K² are now connected with the stays Q, Q', and then the bung in the bung hole J' is removed, after which the barrel J is turned so as to bring the bung hole J' into a lowermost position, as indicated in Fig. 3. The nuts N² are now screwed up so as to securely clamp the arms L in place, the side bars K' K² thus locking the barrel in the discharging position shown in Fig. 3. The tank B now fills with liquid and the vehicle can be readily drawn over the road, lawn or other place, and either valve D or D' opened, so as to cause the liquid to be sprinkled on the desired surface. When the barrel J and the tank B have been emptied, the stays Q and Q' are disconnected from the frame K, then the handle A' is again swung into vertical position, to allow of conveniently removing the empty barrel J from the vehicle either with the use of a skid R or without the same. The frame K is then removed from the empty barrel and applied to the filled one, which latter is then placed in position in the tank B, as above described.

In order to permit of keeping the sprinkling heads C, C' in horizontal position in case the sprinkler is used on crowned roads or the like, the body of the vehicle A is made adjustable relatively to the wheels A⁴, and for this purpose the axle A⁵ carrying the wheels A⁴ is provided with springs A⁶ attached to longitudinal beams A⁷ mounted to slide up or down on bearings S held in the sides A⁸ of the vehicle body, and screws T serve to hold the beams A⁷ in the adjusted position. Thus by the arrangement described either side of the vehicle body can be raised or lowered to maintain the sprinkling head in level position while the wheels A⁴ travel on a crowned surface.

Having thus described my invention, I claim as new and desire to secure by Letters Patent:

1. A sprinkler, comprising a wheeled vehicle, a tank mounted on the said vehicle and having valved sprinkling heads, a barrel support within the tank having wheels on which the barrel is adapted to rest, rods on which the wheels are journaled, and brackets attached to the vehicle frame and on which the ends of the rods are supported, a barrel filled with the liquid to be sprinkled, and a frame in which the barrel is mounted to turn.

2. A sprinkler, comprising a wheeled vehicle, a tank mounted on the said vehicle, a barrel support within the tank, a barrel containing the liquid to be sprinkled, a barrel frame having side members, supporting members for engaging the heads of the barrel and mounted to turn on the said side members of the frame, and means for connecting the barrel frame with the vehicle.

3. A sprinkler, comprising a wheeled vehicle, a tank mounted on the said vehicle and having valved sprinkling heads, a barrel support within the tank, a barrel filled with the liquid to be sprinkled, a barrel frame, supporting members engaging the barrel and mounted to turn on the barrel frame, stays connecting the said vehicle with the said barrel frame, and means for clamping the supporting members in adjusted position on the barrel frame.

4. A sprinkler, comprising a wheeled vehicle, a tank mounted on the said vehicle and open at the top, and a support within the tank for supporting a barrel to be emptied into the tank, the said support having wheels for the barrel to rest on, a barrel frame having connected side members, and supporting members for engaging the heads of the barrel and mounted to turn on the said side members of the frame.

5. A sprinkler provided with a wheeled vehicle having a tank open at the top, a barrel support within the said tank, a barrel for filling the tank with a liquid, and a barrel frame for moving the barrel into position in the tank, the said frame having side bars, screw rods connecting the side bars with each other, and supporting arms for engaging the heads of the barrel and mounted to turn on the said side bars.

6. A sprinkler provided with a wheeled vehicle having a tank open at the top, a barrel support within the said tank, a barrel for filling the tank with a liquid, and a barrel frame for moving the barrel into position in the tank, the said frame having side bars, screw rods connecting the side bars with each other, and supporting arms engaging the heads of the barrel and mounted to turn on the said side bars, and means for fastening the arms in place on the said side bars.

7. In a sprinkler, a wheeled vehicle, a tank mounted on the said vehicle and having valve controlled sprinkling heads, a barrel for containing the liquid to be emptied into the tank, a barrel frame for moving the barrel into position in the tank, the said frame having side members adjustable toward and from each other, supporting members for engaging the heads of the barrel, and mounted to turn on said side members, and means for clamping the said supporting members in position on said side members of the frame.

8. A sprinkler, comprising a wheeled vehicle, a tank mounted on the said vehicle and open at the top, and a support within the tank for supporting a barrel to be emptied into the tank, the said support having wheels for the barrel to rest on and on which the said barrel can be turned to bring the bung hole of the barrel into a lowermost discharging position, rods on which the wheels are journaled, brackets attached to the vehicle frame and on which the ends of the rods are supported, bars connecting the rods adjacent to the wheels, and stays connecting said bars with the body of the vehicle.

9. A sprinkler, comprising a wheeled vehicle, a tank mounted on the said vehicle and having valve controlled sprinkling heads, a barrel support within the tank, a barrel for containing the liquid to be sprinkled, a barrel frame having side bars, means for adjusting the side bars toward or from each other, supporting arms provided with means for engaging the heads of the barrel, the said arms being mounted to turn on said side bars, means for clamping said arms in place on the side bars, and means for connecting the said barrel frame with the vehicle body.

10. In a sprinkler, a wheeled vehicle, a tank mounted on the body of said vehicle and open at the top, the said tank having valved sprinkling heads, a barrel for containing the liquid to be sprinkled, a support within the tank for the barrel and on which the barrel can be turned, a barrel frame, supporting members engaging the heads of the barrel and mounted to turn on the barrel frame, means for clamping the said supporting members in position on the barrel frame, and means for adjusting the body of the vehicle relative to the wheels to maintain the sprinkling heads in horizontal position 11. A sprinkler, comprising a wheeled vehicle, a tank on the said vehicle, and having valve-controlled sprinkling heads, a barrel for containing the liquid to be emptied into the tank, a barrel frame having connected side members provided with bearings, supporting members provided with means for engaging the heads of the barrel, trunnions on which the supporting members are mounted, the said trunnions being journaled in the bearings on the side members of the barrel frame and each having a head at its inner end, and nuts screwing on the outer ends of the trunnions and adapted to abut against the bearings on the side members to clamp the supporting members in position on the said side members In testimony whereof I have signed my name to this specification in the presence of two subscribing witnesses.

JOHN ROBERTSON BARNES.

Witnesses:
ELY A. PIQUET,
POLYDORE BARNES.